United States Patent [19]

Louvel et al.

[11] 3,997,432

[45] Dec. 14, 1976

[54] CONTINUOUSLY ADJUSTING THE INDEX OF FILTRABILITY OF A GAS OIL FRACTION

[75] Inventors: Bernard Louvel, Versailles; Bernard Vourron, Oullins, both of France

[73] Assignee: Institute Francais du Petrole, des Carburants et Lubrifiants et Entreprise de Recherches et d'Activities Petroliers Elf, Paris, France

[22] Filed: May 27, 1975

[21] Appl. No.: 581,348

[30] Foreign Application Priority Data

May 30, 1974 France .......................... 74.18870

[52] U.S. Cl. ........................... 208/354; 196/132; 208/DIG. 1; 208/356
[51] Int. Cl.² ................................. C10G 7/00
[58] Field of Search ............. 208/DIG. 1, 354, 355, 208/356; 196/132

[56] References Cited

UNITED STATES PATENTS

| 3,296,121 | 3/1967 | Potts .................................. 208/355 |
| 3,365,386 | 1/1968 | Van Pool .......................... 208/355 |
| 3,463,725 | 8/1969 | Macforlane et al. .............. 196/132 |
| 3,872,710 | 3/1975 | Louvel ............................... 73/17 R |

*Primary Examiner*—Herbert Levine
*Attorney, Agent, or Firm*—Sughrue, Rothwell, Mion, Zinn & Macpeak

[57] ABSTRACT

Adjustment and control of a product fraction stream and especially gas oil are effected by a control unit after processing information supplied by an analyzer which takes a direct measurement of the temperature of filtrability of the stream and by detectors which deliver signals representing the flow rate of the gas oil withdrawn, the rate of withdrawn of the next higher product stream, the flow rate of the crude petroleum being processed, the flow rate of the stripping vapor and of the next lower product stream, and the slope of the distillation curve of the crude petroleum in the gas oil zone.

3 Claims, 2 Drawing Figures

CONTINUOUSLY ADJUSTING THE INDEX OF FILTRABILITY OF A GAS OIL FRACTION

This invention relates to a method for the continuous control and adjustment of certain characteristics or specifications of the distillation products of a crude petroleum processed in a distillation or so-called "topping" column. A particular although not exclusive aim of the invention consists in continuously adjusting the value of the temperature of filtrability of gas oil withdrawn from said column with a view to maintaining this specification substantially constant and in accordance with a pre-established value by modifying the operation of the column at the level of withdrawal in accordance with the measured variations of said specification.

It is known that, in a topping column, the crude petroleum to be processed is usually injected into an expansion zone of the column at a high temperature of the order of approximately 320° to 380° C. A large proportion of the petroleum which varies in the majority of instances between 40 and 60% is vaporized within said zone so that the vapors produced rise within the column whilst the fraction remaining in liquid form collects at the bottom and constitutes what is known as the topping residuum or reduced crude. The rising vapors are washed by a liquid reflux which is circulated within the column in countercurrent flow. This cold liquid reflux is intended to condense the progressively heavier portions of the vapors at the successive levels of a series of horizontal plates of the superposed weir type for separating the different by-products or cuts of the crude petroleum being processed, said cuts being withdrawn independently at the level of certain plates of the column.

The gas oil in particular, as defined in the case of a crude petroleum given by a cut of this latter or in other words by the product distilled between an initial temperature between 220° and 280° C and a final temperature between 300° and 400° C determined on the curve which is representative of the complete distillation of a sample of the petroleum being processed, is withdrawn laterally from the column in liquid form at the level of a selected plate, the position of which is calculated at the time of the stage of design study and construction of the unit. The sampling point being thus finally established, adjustment of the characteristics of the gas oil thus withdrawn can be obtained only by varying the rate of withdrawal. In fact, as this rate is higher, so the gas oil withdrawn is heavier and this means that its final distillation point is higher. The increase in rate of withdrawal on the corresponding plate in fact produces a substantially equivalent decrease in the rate of cold reflux which passes downwards within the column, in particular from the plate aforesaid. Under these conditions, the flow rate of ascending vapor increases beneath said plate and said vapor produces more effective entrainment of the light fraction of the liquid on the plate and allows only the heavier fraction to condense thereon. The withdrawn liquid therefore becomes heavier at the level of withdrawal while the temperature also rises on said plate. In a process which is exactly the reverse, a reduction in the rate of withdrawal causes the gas oil withdrawn to become lighter.

As is therefore apparent, it is thus possible in a wholly conventional manner to utilize the value of the rate of withdrawal in order to control the nature of the different cuts withdrawn according to the height of the column and in particular to produce action on the final distillation point of the corresponding products, that is to say indirectly on the composition of said products, whilst the initial point of each cut is adjusted by means of the next higher withdrawal in the column or in other words by withdrawal of a lighter by-product in the range of products which can be derived from the crude petroleum being processed. It should be noted that fractionation between two consecutive by-products can advantageously be improved by stripping which consists in injecting at a higher temperature into a small auxiliary column a gaseous fluid such as steam, for example. This stripping process makes it possible to remove from a given product the light fraction which normally forms part of the immediately higher withdrawal within the cut interval defined. Said steam to which this light fraction is thus added is then reinjected into the column in the ascending vapor-phase stream.

Control of withdrawals and especially gas oil by adjustment of the sampling rate therefore consists in modifying the range of distillation of the by-product considered; however, this adjustment does not have any direct influence on the specifications of these by-products and on the filtrability of gas oil in the particular example under consideration which is dependent on other factors and especially on the composition of the initial crude petroleum. It is therefore very difficult to carry out suitable and frequent adjustment of this particular specification without incurring the risk of disturbing the general operation of the column and in any case without impairing the efficiency and constancy of quality.

It is already known that devices have been designed for either continuous or non-continuous measurement of the index filtrability of a liquid and in particular of a gas oil as defined by a particular temperature which is characteristic of the product. An apparatus of this type is disclosed in the U.S. Letters Patent 3,872,710 of Mar. 25, 1975 in the name of applicant to which useful reference can be made. This apparatus detects in particular the limiting temperature below which crystallization of the paraffins of gas oil takes place, detection being carried out through a filter which is calibrated during a predetermined cooling cycle. The drop in flow rate across said filter which is detected by means of a suitable measuring instrument is employed for the purpose of initiating the recording of said temperature.

The present invention is directed to a method for the continuous control and adjustment of an atmospheric distillation or topping column by producing action on the rate of product withdrawals from said column and gas oil in particular, especially by means of indications supplied by a filtrability analyzer which produces cyclically a direct and rapid measurement of the corresponding specification. This makes it possible not only to control the separation in cuts of the crude petroleum being processed but also to produce within said cuts a rapid action on the operating conditions for the purpose of adjusting the characteristics of the specifications of the by-products obtained.

The design and construction of the apparatus employed for analyzing filtrability are such as to readily permit of industrial application which affords a high degree of reliability and minimum maintenance and is particularly well suited to the operating conditions which are contemplated.

To this end, the method under consideration consists in performing by means of an analyzer a direct measurement of the temperature of filtrability in the withdrawal stream of the product to be studied and especially gas oil, then in producing action on said withdrawal stream by means of a control unit adapted to process the information supplied on the one hand by the analyzer after a correction which takes into account the time-lag between the instant of analysis and the action produced on the withdrawal stream and on the other hand by detectors whose signals are representative respectively of the flow rate of the gas oil withdrawn, of the rate of withdrawal above the gas oil within the column, of the flow rate of the crude petroleum being processed, of the flow rate of the vapor employed for stripping the withdrawal streams of gas oil and of the product located below, and finally of the slope of the distillation curve of the crude petroleum in the gas oil zone.

The method under consideration thus makes it possible to produce action on the control of the rate of withdrawal of the gas oil and consequently, by reason of the effect produced by said adjustment on the other rates of withdrawals, also permits action on the control of the operation of the distillation column in order to obtain at the same time a maximum yield of gas oil, a stable adjustment of the specification and especially of the filtrability of said product, the possibility of rapidly modifying the operating conditions in the event of a change of specification and of the operational safety devices in the event of failure of the analyzer or in the event of faulty adjustment in the column which is liable to impair the quality of the product.

The filtrability analyzer is advantageously supplied by means of a loop for sampling gas oil taken at the exit of the column from the withdrawal stream, under conditions of temperature corresponding to those of the apparatus. This sampling loop thus ensures continuous renewal of the gas oil at the level of the analyzer and does not introduce any additional delay of substantial magnitude in obtaining the value of the specification.

Preferably, the signal supplied by the analyzer for cyclic measurement of the temperature of filtrability is recorded directly in the control unit, then stored in memory in order to retain the value of the specification as measured at each analysis and in order to maintain said value between two successive analyses. In accordance with an alternative embodiment, the control unit is so arranged as to record the value of the temperature of filtrability in the analyzer at the precise instant of measurement.

Broadly speaking, starting from the difference between a given reference value of the temperature of filtrability and the measurement of said value as delivered by the analyzer, the control unit calculates the amplitude of the adjustments to be made in the distillation column, especially in the rate of withdrawal of the gas oil, in order to maintain the measured filtrability at its reference value. To this end, the control unit takes into account the time-lag between reception of the signal delivered by the analyzer and the action produced on the withdrawal flow and superimposes a compensation thereon so as to take into account any possible variations in the measurable quantities which are liable to disturb the value of the temperature of filtrability of the gas oil.

The method according to the invention therefore consists in carrying out a control action by means of the measurement given by the filtrability analyzer, which has an effect on the rate of withdrawal of the gas oil and produces a possible additional action by means of the rate of withdrawal above the gas oil within the column as well as the flow rate of the stripping vapor. It should be noted that, in the event that the last-mentioned action takes place, the control unit ensures a constant ratio between the flow rate of injected vapor and the rate of withdrawal.

Further properties of the method of control according to the invention will become apparent from the following description of one example of application which is given by way of indication without any limitation being implied, reference being made to the accompanying drawings, wherein.

Figure 1:
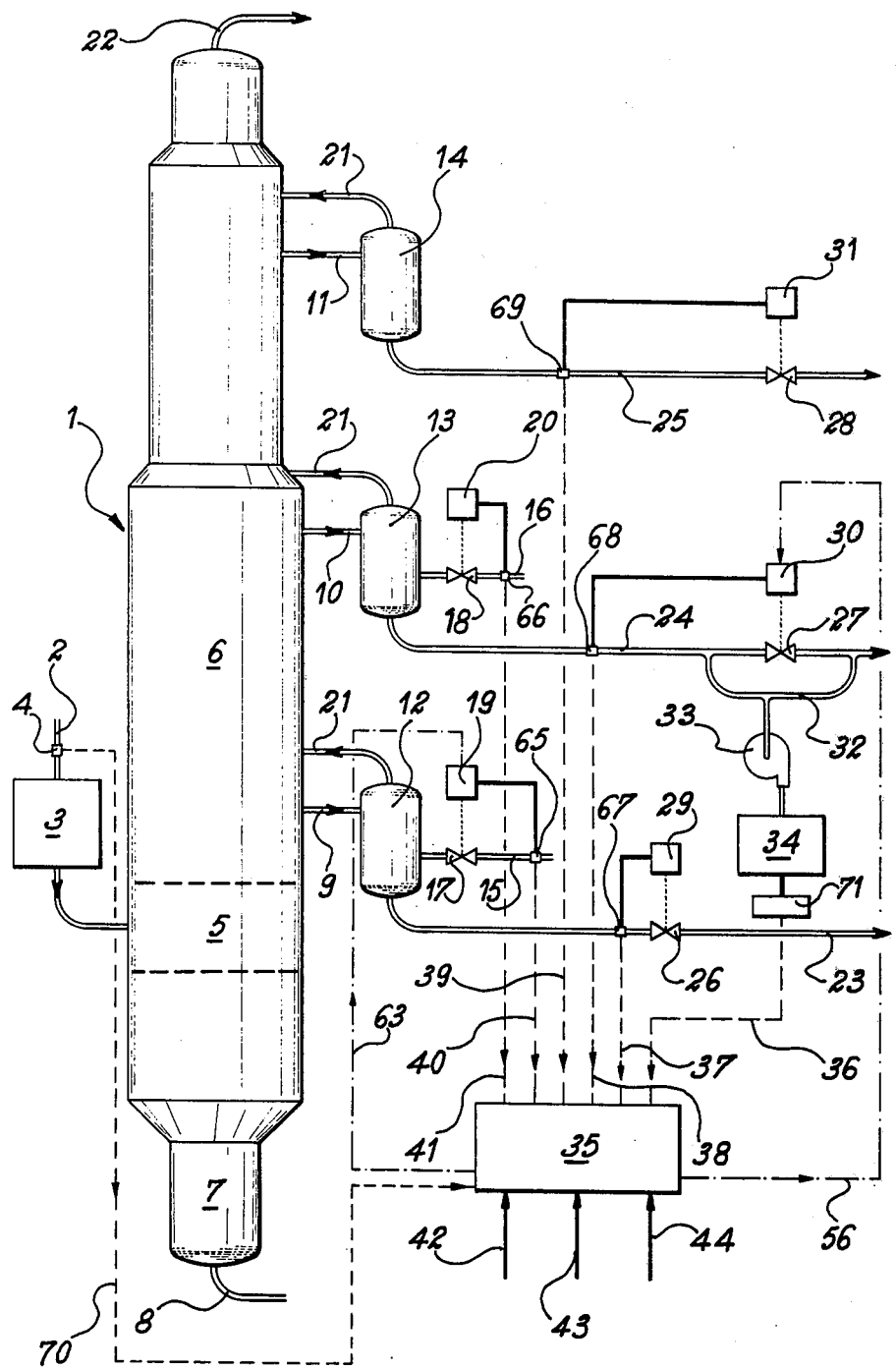
FIG. 1 is a diagrammatic view in elevation showing an atmospheric distillation or topping column comprising a pipe for the withdrawal of gas oil from said column, a filtrability analyzer for carrying out in accordance with the invention the adjustment of the specification of the product and control of the operation of the column.

In FIG. 1, the reference numeral 1 designates diagrammatically a distillation column of conventional type having a vertical axis which is intended to process crude petroleum and especially to carry out distillation of this latter at atmospheric pressure while permitting withdrawal from the column of the different by-products or "cuts" which can be obtained such as, in particular, gasoline, naphtha, kerosine, the gas oils and so forth. On the upstream side of the column 1, the petroleum to be processed is fed through an admission pipe 2 into a furnace 3 in which its temperature is increased to a value of approximately 320° to 380° C, the flow rate of this stream being measured by means of a flow meter 4. The petroleum which is discharged from the furnace is then fed into the column in a zone which is designated by the reference numeral 5. An abrupt expansion of the petroleum takes place within said zone and is accompanied by the vaporization of a substantial fraction of this latter so that the vapor obtained passes upward within the column into the region 6 located above the expansion zone 5 whilst the remaining fraction or so-called topping residuum in the form of liquid falls into the bottom 7 of said column and is removed through a pipe 8. The column 1 is provided with a series of horizontal distillation plates (not shown), especially in the region 6 which is located above the expansion zone 5. The progressively lighter fractions of the ascending vapor derived from the expansion zone are condensed successively at the level of said plates. By means of these side-stream withdrawal pipes which are designated respectively by the reference numerals 9, 10 and 11 in the example of construction shown in the figure, different cuts obtained from the distillation of the crude petroleum being processed can be extracted from said column at the level of a certain number of the plates mentioned above. Said cuts can correspond in particular to a heavy gas oil in the case of withdrawal through the pipe 9, to a light gas oil in the case of withdrawal through the pipe 10 and finally in the case of withdrawal through the pipe 11, to the product located immediately beneath the gas oil on the distillation curve, namely kerosine.

The side streams derived from the pipes 9, 10 and 11 pass through steam stripping columns 12, 13 and 14 respectively, thereby subjecting the withdrawn products to a treatment at higher temperature in order to permit vaporization of the lightest fraction which is entrained in the product considered and in particular which forms part of the next higher side stream in each case. The flows of vapor, for example in the columns 12 and 13 and corresponding to the light and heavy gas oils withdrawn through the pipes 9 and 10, are adjusted by means of valves 17 and 18. Said valves are associated with regulating devices 19 and 20 for controlling the flows of vapor which are measured by means of instruments 65 and 66 and fed into each stripping column 12 and 13. From these columns, the vaporized light fractions and the remaining vapor are re-introduced through pipes 21 at different levels of the column 1. The head of said column is finally provided with a discharge pipe 22 for the lightest fraction corresponding to gasoline.

The different side streams which are thus stripped by steam treatment are then discharged through pipes 23, 24 and 25 respectively, the flow rate of said side streams within said pipes being adjusted by regulating valves 26, 27 and 28 each associated with a regulating unit 29, 30 or 31 for controlling and adjusting these flows which are measured by flow meters 67, 68 and 69.

In accordance with the invention, a fraction of the gas oil which passes out through the withdrawal pipe 24 and is continuously representative of this latter is collected in a sampling loop 32. By means of a pump 33, said fraction is passed from said loop to a filtrability analyzer 34, the constructional detail of this latter being preferably in accordance with the analyzer described and claimed in U.S. Pat. No. 3,872,710.

The information which is necessary for controlling the operation of the column 1 and in particular for controlling the filtrability of the gas oil withdrawn from said column is collected in a control unit 35. To this end, an electrical signal which is delivered by the analyzer 34 and is representative of the filtrability measured by said analyzer is first transmitted to said control unit via a connecting lead 36. Signals which are representative of the rates of withdrawal within the pipes 23, 24 and 25 are also applied to the unit 35 by means of leads 37, 38 and 39 from flow-measuring instruments 67, 68 and 69. In addition, a signal which is representative of the flow rate of crude petroleum processed within the unit measured by the flow meter 4 in the pipe 2 is transmitted to the unit 35 via the lead 70. Finally, there are applied to the unit 35 via the leads 40 and 41 other signals representing the values of the steam-stripping flow rates within the columns 12 and 13, that is to say the values respectively of the rate of withdrawal of gas oil in which the filtrability of flow within the pipe 24 is measured and of the heaviest product withdrawn through the pipe 23 and corresponding to the next higher cut in the curve of distillation of the crude petroleum. By means of leads 42, 43 and 44, the unit 35 receives information corresponding to the reference value of the index of filtrability of the gas oil, to the reference value of the degree of stripping so as to maintain the ratio of flow rates at constant values in the different side streams, and finally to the slope of the distillation curve in the gas oil zone for the crude petroleum which is processed within the column.

The filtrability analyzer 34 which is supplied by the loop 32 for sampling the gas oil withdrawn through the pipe 24 ensures continuous renewal of the product at the level of the analyzer without introducing any additional delay in obtaining the signal which is representative of the specification. The signal which is in fact supplied is accordingly memorized in a unit 71, the recorded value being retained between two analyses. By way of alternative, the unit 35 can be controlled in order to take the measurement directly from the analyzer at the moment of detection of clogging of the filter. This signal, together with those delivered by the various detectors, accordingly makes it possible to ensure continuous checking of the operation of the distillation column by controlling simultaneously the degree of stripping of the gas oil and its index of filtrability with respect to a pre-established reference value.

Figure 2:
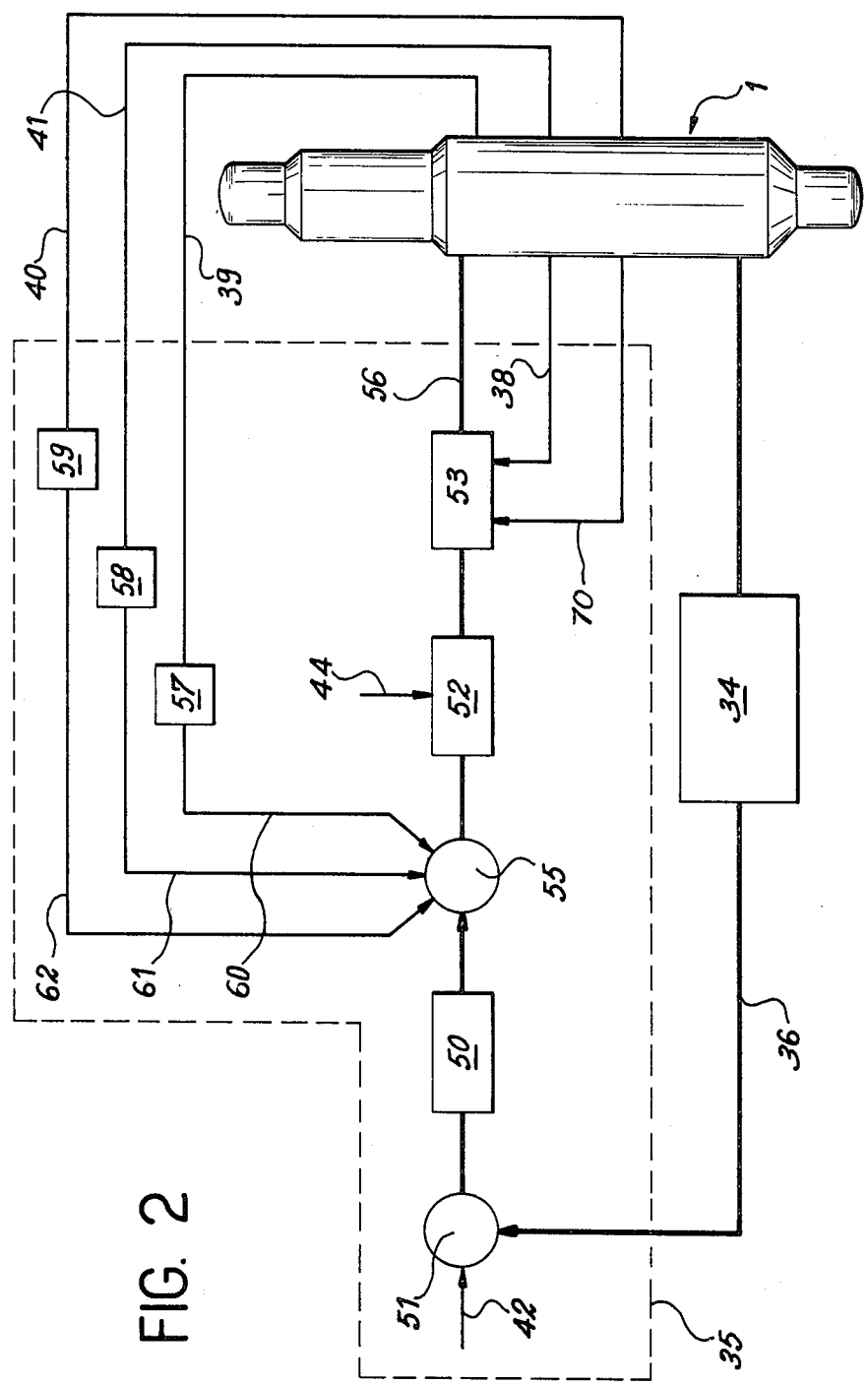
FIG. 2 is a schematic diagram showing the arrangement of the analyzer and of the different detectors which serve to deliver signals for controlling the installation from the distillation column to the control unit.

To this end and as illustrated in the diagram of FIG. 1, the control unit 35 carries out a first regulating action or so-called "closed loop" action by means of the measurement which is delivered directly by the analyzer 34. The control signal from control unit 35 is then carried by lead 56 to regulating unit 30 for controlling the variation to be imposed on the rate of withdrawal, namely in actual fact at the level of the cut temperature between the gas oil and the product withdrawn immediately beneath. The calculation of this action introduces into a correcting circuit fifty different conventional regulating actions (proportional, integral and derived) applied to the so-called standardized square of the error as measured in an input comparator circuit 51 (FIG. 2) between the reference value of the specification of the product and the measurement of filtrability supplied by the analyzer 34. These arrangements which are given by way of non-limitative example make it possible in particular to compensate for the time-delay between the action on the rate of withdrawal and the variation in filtrability detected by the analyzer 34. The result thereby achieved in particular is to reduce the effect of the regulation when the measured value is close to the reference value, that is to say when the error signal is weak and on the contrary to increase said effect when said measured value is far removed from said reference value. The loop which is formed constitutes a stable system and exhibits appreciable rapidity of response, even in the event of variation in the reference value, the signal of variation of the corresponding cut temperature being provided by the formula:

$$\Delta T = (S) \cdot \left| \frac{\epsilon}{N} \right|^2 \cdot [P + I + D]$$

where $\epsilon$ is the error signal, (S) is the sign of said signal, N is the standardization value, P is the proportional action, I is the integral action and D is the derived action. The value N is chosen arbitrarily and defines the measured deviation from which the actions are to be increased or reduced.

The control unit 35 serves to produce action on the system by means of a cascade action which modifies the reference value of the flow rate of withdrawn gas oil. This action consists in calculating successively the variation in yield to be imposed on the gas oil, namely:

$$\Delta R = \frac{\Delta T}{p}$$

where $p$ is the slope of the distillation curve of the crude petroleum being processed, in the gas oil zone, from which is deduced the optimum value $R_o$ of said yield:

$$R_o = R \text{ measured} + \Delta R$$

the optimum flow rate of the gas oil $D_o$ such that $$D_o = D_B \times R_o$$

where $D_B$ is the flow rate of the crude petroleum at the point of entry into the column. To this end, the output signal of the correcting device 50 is fed into a proportional circuit 52 which receives the value of the slope $p$ via the lead 44; the signal derived from said circuit and representative of the variation in yield R is modified in a second circuit 53 which receives via the leads 38 and 70 the signals which are representative of the gas oil flow rate measured in the pipe 24 by the device 68 and the petroleum flow rate measured at the inlet by the flow meter 4. This set of corrective measures applied to the error signal has the advantage of taking into account an overall characterization of the crude petroleum processed by means of the slope of its distillation curve in the gas oil zone and of compensating automatically for any possible variations in the flow of said crude petroleum by introducing the concept of yield in the final control quantity.

The unit 35 also permits a predictive action on the operation of the column, on the one hand by means of the variations measured in the rate of withdrawal of the product located above the gas oil in the distillation column while ensuring automatic compensation for the effects of these variations on the control of the specification and on the other hand by means of the degrees of steam stripping of the gas oil and of the product withdrawn beneath; these variations have a proportional action on the optimum cut temperature of the gas oil with coefficients $K_1$, $K_2$ and $K_3$. To this end, the signals which are representative of these flows are delivered respectively via the leads 39, 41 and 40 to the compensating circuits 57, 58 and 59. The output signals of these circuits are fed via the leads 60, 61 and 62 into an adding circuit 55 which is placed between the corrector 50 and the proportional circuit 52. Finally, when it is possible to do so, the unit 35 permits control of the flow rates of stripping steam so as to maintain a pre-established ratio between the flow rate of steam and the flow rate of the withdrawn product, for example by means of the lead 43. By direct and continuously re-adjusted measurement of the filtrability provided by the analyzer, control of the operation of the distillation column is thus ensured by regulating the value of this specification as measured in the gas oil which is withdrawn at its reference value with an optimum yield. This reference value can readily be modified with automatic compensation for the other parameters which govern the operation of the installation.

What we claim is:

1. A method for continuously adjusting the index of filtrability of a gas oil withdrawn from an atmospheric distillation column comprising withdrawing a stream of gas oil from said column, measuring the index of filtrability of the stream by means of an analyzer to provide a representative signal, measuring the flow rate of the gas oil stream to provide a representative signal, measuring the rate of withdrawal of a stream from the column above said gas oil stream to provide a representative signal, measuring the flow rate of the crude petroleum being supplied to said column to provide a representative signal, measuring the flow rate of the vapor employed for stripping the withdrawal streams of the gas oil and of the product withdrawn from the column immediately below said gas oil stream to provide representative signals, providing a signal representative of the slope of the distillation curve of the crude petroleum in the gas oil zone, feeding all of said foregoing signals to a control unit, processing the signals to provide a control signal and utilizing said control signal to control the rate of withdrawal of said gas oil stream from said column to thereby control the index of filtrability of said gas oil.

2. A method as set forth in claim 1 further comprising recording the representative signal supplied by the analyzer for cyclic measurement of the temperature filtrability directly in the control unit and then memorizing the recorded signal in order to retain the value of the temperature as measured at each analysis and to maintain said value between two successive analyses.

3. A method according to claim 1 further comprising recording the value of the temperature of filtrability in said control unit at the precise instant of measurement.

* * * * *

UNITED STATES PATENT AND TRADEMARK OFFICE
CERTIFICATE OF CORRECTION

PATENT NO. : 3,997,432
DATED : December 14, 1976
INVENTOR(S) : Bernard LOUVEL et al It is certified that error appears in the above-identified patent and that said Letters Patent are hereby corrected as shown below:

IN THE HEADING:

Under "Assignee", delete

"Institute Francais du Petrole, des
Carburants et Lubrifiants et
Entreprise de Recherches et
d'Activities Petroliers Elf", and insert --Entreprise de Recherches et
d'Activites Petroliers ELF--.

Signed and Sealed this

Nineteenth Day of April 1977

[SEAL]

Attest:

RUTH C. MASON
Attesting Officer

C. MARSHALL DANN
Commissioner of Patents and Trademarks